G. E. PAGE.
MACHINE FOR PASTEURIZING MILK AND OTHER LIQUIDS.
APPLICATION FILED OCT. 8, 1917.

1,352,214.

Patented Sept. 7, 1920.
2 SHEETS—SHEET 1.

WITNESSES:
Nelson H. Copp
H. E. Stonebraker

INVENTOR.
George E. Page
BY Church & Rich
his ATTORNEYS.

G. E. PAGE.
MACHINE FOR PASTEURIZING MILK AND OTHER LIQUIDS.
APPLICATION FILED OCT. 8, 1917.

1,352,214.

Patented Sept. 7, 1920.
2 SHEETS—SHEET 2.

WITNESSES:
Nelson H. Copp
H. E. Stonebraker

INVENTOR.
George E. Page
BY Church & Rich
his ATTORNEYS.

UNITED STATES PATENT OFFICE.

GEORGE E. PAGE, OF ROCHESTER, NEW YORK, ASSIGNOR OF ONE-HALF TO PAUL C. ZAENGLEIN, OF ROCHESTER, NEW YORK.

MACHINE FOR PASTEURIZING MILK AND OTHER LIQUIDS.

1,352,214.    Specification of Letters Patent.    Patented Sept. 7, 1920.

Application filed October 8, 1917. Serial No. 195,283.

*To all whom it may concern:*

Be it known that I, GEORGE E. PAGE, of Rochester, in the county of Monroe and State of New York, have invented certain new and useful Improvements in Machines for Pasteurizing Milk and other Liquids; and I do hereby declare the following to be a full, clear, and exact description of the same, reference being had to the accompanying drawings, forming a part of this specification, and to the reference characters marked thereon.

My invention has to do with the pasteurization of liquids, and the primary purpose is to afford an economical apparatus for pasteurizing milk, thereby placing the system within the financial reach of the ordinary small dairyman. A further purpose of the invention is to afford an apparatus which will be efficient, and particularly to insure heating the liquid to be pasteurized evenly and uniformly throughout, irrespective of the sizes of the containers in which it is held. Another object of my improvement is to afford apparatus that can be cheaply manufactured and by which the pasteurization can be carried out speedily and with little difficulty. To these and other ends the invention consists in certain improvements and combinations of parts, all as will be hereinafter more fully described, the novel features being pointed out in the claims at the end of the specification.

In the drawings.

Similar reference characters throughout the several views indicate the same parts.

There are various ways in which my invention may be carried out in a practical manner, and I have shown one means therefor suitable for use with the ordinary refrigerating receptacle such as employed by dairymen, and operated by feeding in from the bottom a supply of water which surrounds the bottles or containers placed within the receptacle. Described briefly, my invention comprises the combination with such a receptacle in which are placed open containers filled with the liquid under treatment, of a cover or hood for each container that entirely surrounds and provides an air seal for its upper end. Means also are provided for first filling the receptacle with cold water until the containers are submerged and then gradually introducing steam into the cold water at the bottom of the receptacle, whence it rises around the bottles, and brings them to the desired temperature. The cover is spaced far enough from the container to afford an air pocket of sufficient volume to prevent the liquid in the receptacle from reaching the interior of the container, as the latter is submerged.

The pasteurizing receptacle of the illustrated embodiment is designated by 1, having an inlet pipe 2, through which cold water or steam may be supplied from the respective pipes 3 and 4. 5 designates a drain pipe.

Figure 5:
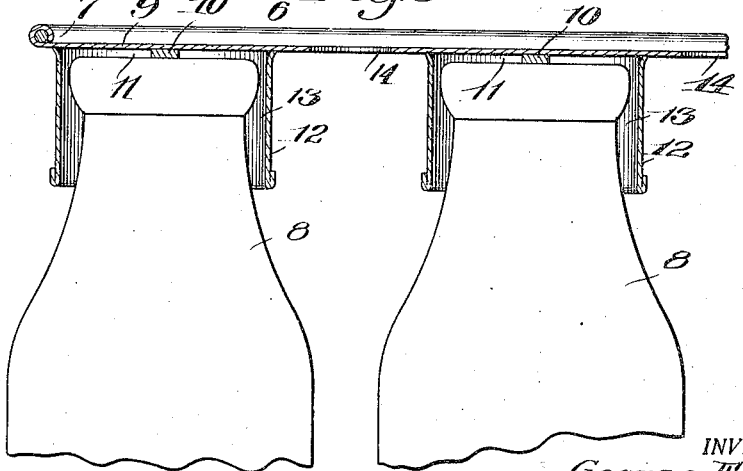
Fig. 5 is an enlarged vertical sectional view illustrating the position of the cover supporting device coöperating with a couple of milk bottles of conventional form.

The pasteurizing device comprises a cover supporting plate designated generally by 6, and preferably weighted by means of suitable bars or ribs 7. The supporting plate 6 carries on its under side a series of covers, one of which coöperates with each container. Referring to Fig. 5, the container, which is here shown in the form of a milk bottle, is designated by 8, and its cover includes a top 9, on the under side of which is arranged means for engagement with the container. This is preferably in the form of a projecting portion or strip 10 extending entirely across the top of the container, or otherwise arranged to engage the container at opposite points and hold the cover spaced from it. The projecting portion or strip 10 serves to hold the top 9 of the cover in spaced relation to the top of the container, affording an air space 11. The cover also includes a side wall or hood 12 extending downwardly. The hood 12 entirely surrounds the upper end of the container, and is also in spaced relation thereto providing an air pocket 13. The cover supporting plate carries a series of openings 14 arranged between the various covers, and acting to permit water readily to rise above and submerge the supporting plate, and counteracting the buoyancy produced by the air pockets within the covers.

Figure 1:
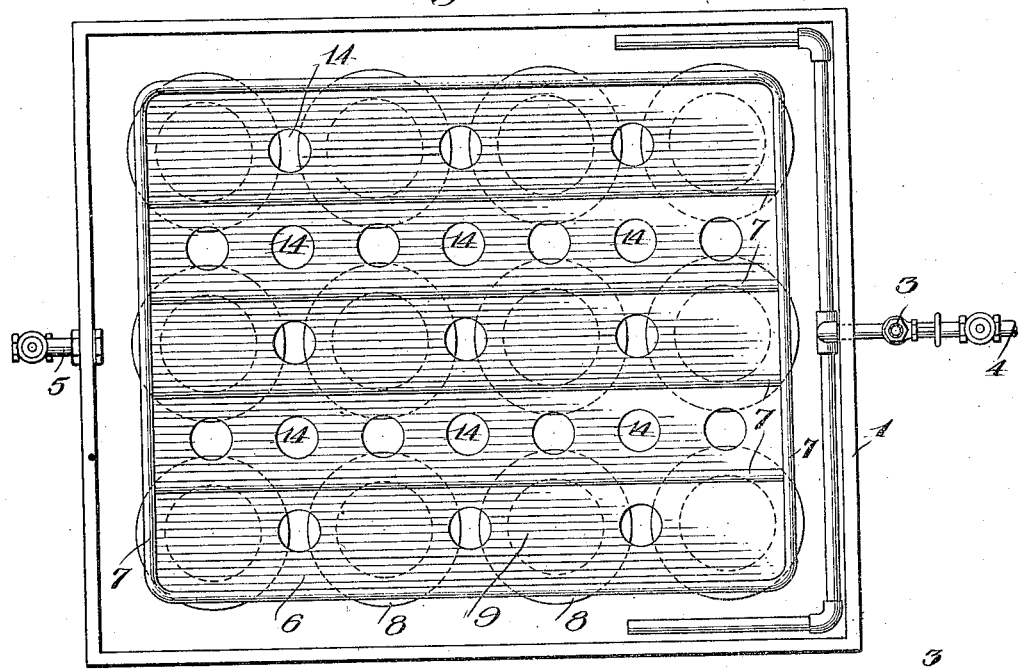
Figure 1 is a plan view showing a form of apparatus for carrying out my invention.
Figure 2:
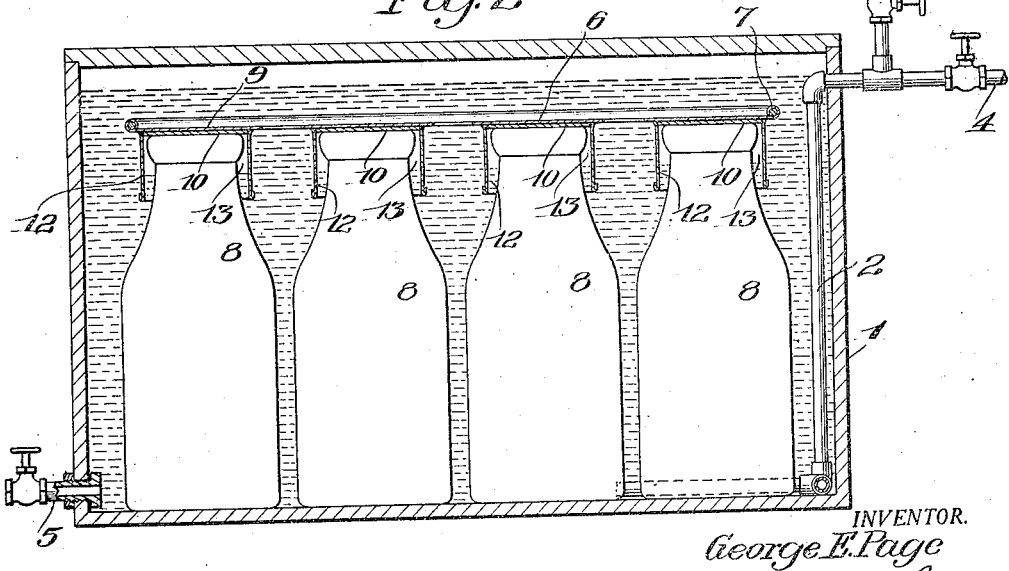
Fig. 2 is a vertical sectional view showing the position of the respective parts when in operation.
Figure 3:
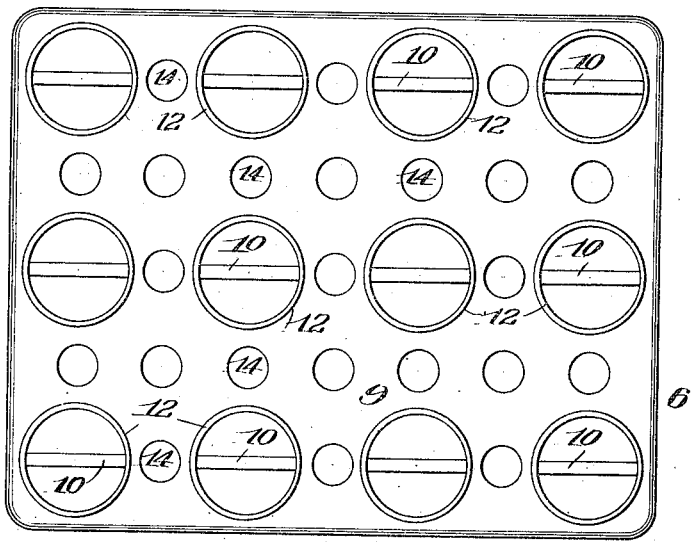
Fig. 3 is a bottom plan view of the cover supporting device.
Figure 4:
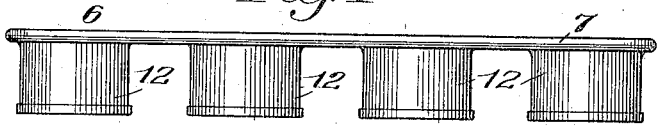
Fig. 4 is a side elevation of the same.

The steam used for pasteurizing is fed in at the bottom of the receptacle, and rises around the containers, which are already submerged in cold water. When the cold water reaches the inside of the hood 12, it is prevented from rising within the cover by the air seal formed by the air spaces 11 and 13. This air seal is sufficient to prevent the water from rising to any substantial degree and holds it at substantially the level indicated in Fig. 2. As the heating liquid is cooled, it produces a contracting influence upon the liquid being treated within the container, which will have a tendency to draw the heating liquid higher within the hood 12, but the volume of the air space 11 is sufficient to prevent the heating liquid from reaching the top of the container inside the cover. The process is carried on as indicated, and after the heating liquid is held for the required length of time, it is drawn off from the receptacle and cold water again introduced.

One of the chief advantages of the apparatus which I have described is in the uniformity of heating made possible thereby, due to the steam or hot water being supplied from the bottom. The heating medium thus passes upwardly into contact with the entire contents of the receptacle, with the result that all the containers acquire the same degree of temperature in the same time, irrespective of their cross sectional areas. This makes it possible to employ the apparatus with different sized containers without any special provisions, other than having the container covers of the appropriate proportions to correspond with the sizes of the tops of the containers. A further advantage resides in the means for controlling the heat imparted to the liquid under treatment, since its temperature cannot rise above the temperature of the water, and thus excessive heating is prevented.

For the pasteurization of milk the bottles are arranged in the receptacle and submerged in cold water by feeding the water in from the bottom. Steam is then permitted to enter at the bottom of the body of cold water, until a temperature of approximately 140° Fahrenheit is reached. The heating liquid is held at this temperature for a period of approximately thirty minutes, after which the hot water is drained off from the bottom of the receptacle. It is preferable to leave a small volume of hot water in the bottom of the receptacle so that when the cold water is subsequently turned on, and gradually fills the receptacle, the small body of hot water will rise and gradually absorb the heat from the containers and prevent such sudden chilling as would otherwise break them.

I claim as my invention:

1. In a pasteurizing apparatus, the combination with a receptacle having an outlet opening, a plurality of containers in said receptacle, means for introducing water and steam at the bottom of the receptacle, and a cover for said containers supported in spaced relation thereto and comprising a hood spaced from but completely surrounding the upper end of each container for preventing the water from overflowing into the container.

2. In a pasteurizing apparatus, the combination with a receptacle having an outlet opening, a plurality of containers in said receptacle, means for introducing water at the bottom of said receptacle, means for introducing steam into the water contained in the receptacle for heating the same, a cover for said containers supported in spaced relation thereto, and means on the cover surrounding the upper end of each container for preventing the water from overflowing into the containers.

3. A pasteurizing apparatus comprising a receptacle provided with means for supplying fluid to the bottom thereof and also with a draining means, a plurality of containers in said receptacle, and a cover provided with a plurality of hoods for said containers having walls extending below the tops of the containers, said cover being supported in spaced relation to said containers to form an air seal for said containers.

GEORGE E. PAGE.